(12) United States Patent
Li

(10) Patent No.: US 8,868,509 B2
(45) Date of Patent: Oct. 21, 2014

(54) BACKUP AND RESTORE DATA FROM A CLOUD COMPUTING ENVIRONMENT

(75) Inventor: Feng Li, Beijing (CN)

(73) Assignee: CA, Inc., Islandia, NY (US)

( * ) Notice: Subject to any disclaimer, the term of this patent is extended or adjusted under 35 U.S.C. 154(b) by 235 days.

(21) Appl. No.: 12/952,639

(22) Filed: Nov. 23, 2010

(65) Prior Publication Data

US 2012/0130955 A1    May 24, 2012

(51) Int. Cl.
*G06F 17/30*    (2006.01)
*G06F 11/14*    (2006.01)

(52) U.S. Cl.
CPC ................................ *G06F 11/1451* (2013.01); *G06F 11/1464* (2013.01)
USPC .......................................... 707/654; 707/652

(58) Field of Classification Search
USPC ......... 707/609, 611, 617, 618, 620, 621, 627, 707/628, 632, 654, 656, 661, 674, 679, 686, 707/687, 690, 821, 999.008, 999.202, 707/999.204, 999.205, 999.101, 999.002, 707/636, 640, 652; 711/100; 709/201, 203, 709/212, 223, 224, 227
See application file for complete search history.

(56) References Cited

U.S. PATENT DOCUMENTS

| | | | |
|---|---|---|---|
| 7,693,581 B2 * | 4/2010 | Callaghan et al. ................ | 700/9 |
| 2010/0125664 A1 | 5/2010 | Hadar et al. | |
| 2010/0211782 A1 * | 8/2010 | Auradkar et al. ............ | 713/168 |
| 2011/0113327 A1 * | 5/2011 | Hagelund ..................... | 715/265 |
| 2011/0145199 A1 * | 6/2011 | Prasad Palagummi ....... | 707/654 |
| 2011/0161076 A1 * | 6/2011 | Davis et al. .................. | 704/231 |
| 2011/0244919 A1 * | 10/2011 | Aller et al. ................ | 455/556.1 |

OTHER PUBLICATIONS

Reding, V., "Back to the Future of Internet", IEEE Internet Computing, US, vol. 14, No. 1, Jan.-Feb. 2010, pp. 24-26, ISSN: 1089-7801.

* cited by examiner

*Primary Examiner* — Greta Robinson
(74) *Attorney, Agent, or Firm* — Myers Bigel Sibley & Sajovec, P.A.

(57) ABSTRACT

A system and method for backing up data computed using an application in a cloud computing environment, comprising creating the application, modifying the application to register a servlet, publishing the application to the cloud computing environment, during execution of the application, using the servlet for: detecting annotated entities in the application, finding out properties and property types of the annotated entities, generating one or more structured query language (SQL) statements to query out data to be backed up in accordance with the annotated entities, and publishing the backed up data. Modifying may comprise inserting archiving-type files into the application. An annotation processor may be added to the application may occur. A user interface displaying one or more of the SQL statements performed during the execution of the application may be generated. The user may confirm the displayed SQL statements. A library may be added to the application.

21 Claims, 2 Drawing Sheets

BACKUP AND RESTORE DATA FROM A CLOUD COMPUTING ENVIRONMENT

FIELD OF THE INVENTION

The present disclosure relates generally to computer systems and software, and more particularly to backing up and restoring data in a cloud computing environment.

BACKGROUND OF THE INVENTION

A cloud computing environment contains computing resources which are available to users for their computing needs. In a cloud computing environment, developers can upload their applications to be hosted inside the cloud which provides computing resources and data storage. During the on-line time in which an application is hosted and processing on the cloud, very valuable information can be generated by the application. For example, suppose an on-line transaction system is hosted on a cloud computing environment such as Google AppEngine. While the application is executing on-line, there may be a lot of transaction data generated by its users or customers and this data could be very valuable to the application owner. But the key application data will be stored inside the Google AppEngine; currently, there is no convenient way to download the data or back them up.

SUMMARY OF THE INVENTION

The inventive system and method enables back up and restoration out of the cloud computing environment of application data manipulated in the cloud during execution of an application. The system and method comprises creating the application, modifying the application to register a servlet, publishing the application to the cloud computing environment, and during execution of the application, using the servlet for: detecting annotated entities in the application, finding out properties and property types of the annotated entities, generating one or more structured query language (SQL) statements to query out data to be backed up in accordance with the annotated entities, and publishing the backed up data.

In one aspect, modifying further comprises inserting archiving-type files into the application. In one aspect, a step of adding an annotation processor to the application is performed. In one aspect, a step of generating a user interface displaying one or more of the SQL statements performed during the execution of the application is performed. In one aspect, a user can confirm the displayed SQL statements. In one aspect, adding a library to the application can be performed.

A system for backing up data computed using an application in a cloud computing environment, in one aspect may include a processor, a module operable to create the application, modify the application to register a servlet, and publish the application to the cloud computing environment, and during execution of the application, the module being further operable to use the servlet for detecting annotated entities in the application, finding out properties and property types of the annotated entities, generating one or more SQL statements to query out data to be backed up in accordance with the annotated entities, and publishing the backed up data.

In one aspect, the system may include a display device, such as a monitor, a terminal, a personal computer, a mobile device, and the like, for displaying one or more of the SQL statements performed during the execution of the application. In one aspect, the system may include an input device for confirming by a user the displayed SQL statements. In one aspect, the module is further operable to insert archiving-type files into the application. In one aspect, the module is further operable to add an annotation processor to the application. In one aspect, the module is further operable to add a library to the application.

A computer readable storage medium and/or a device storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
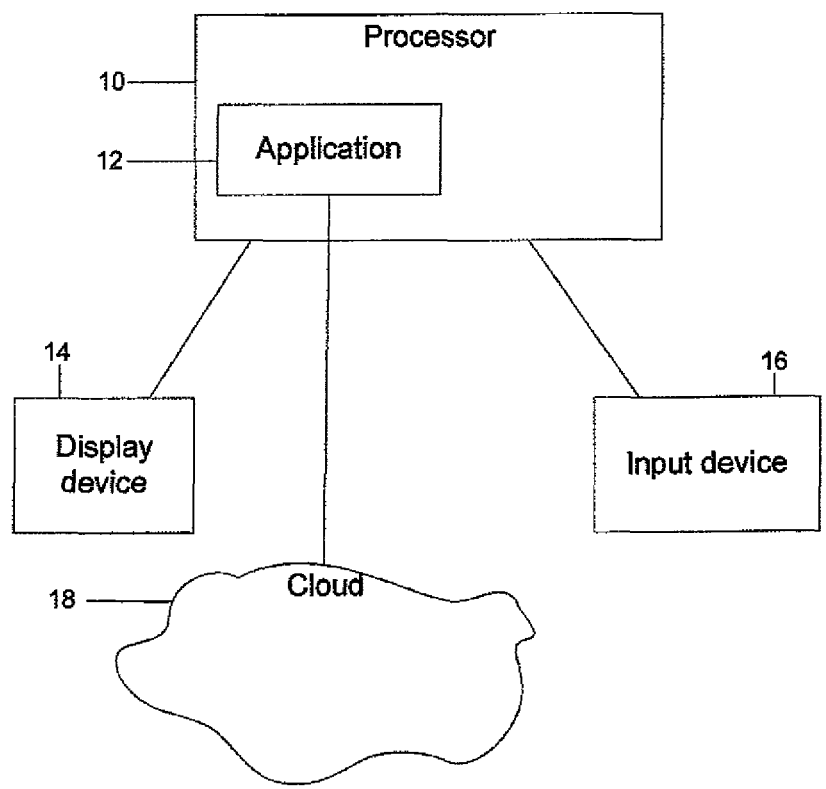
FIG. 1 is a schematic diagram of the inventive system.

An inventive solution to the need for obtaining and storing data outside the cloud, the data generated during cloud computing, is presented. FIG. 1 is a schematic diagram of the inventive system. As shown in FIG. 1, the system includes a processor 10, an application 12, a display device 14, an input device 16, and a cloud computing environment 18. The application 12 can reside in the processor 10. The display device 14 and/or the input device 16 can be connected to the processor 10. The application 12 and the cloud computing environment 18 can be connected via the internet or in any method known in the art.

Figure 2:
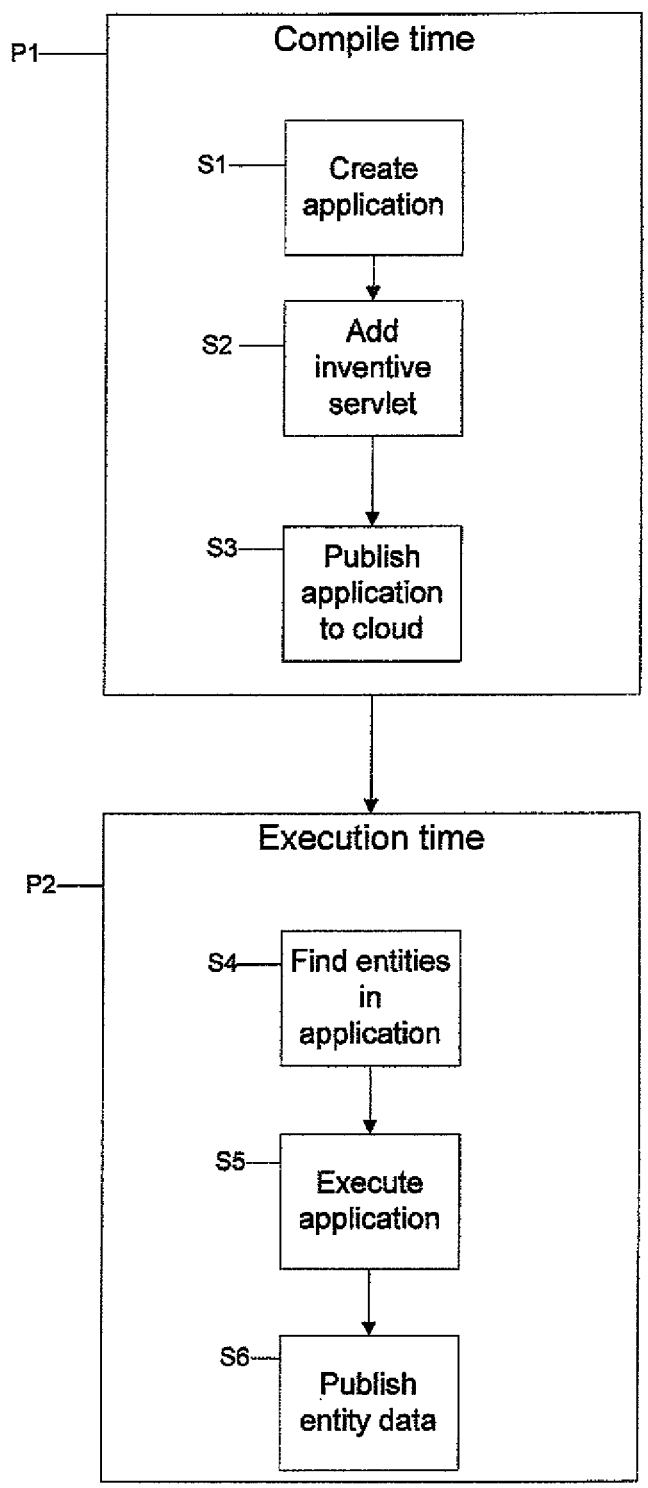
FIG. 2 illustrates the overall flow of the inventive system.

FIG. 2 shows a flow diagram for the inventive solution. In the first phase P1, prior to publication of the application in the cloud, in step S1 the software and/or application developer creates the application to be implemented using cloud computing. During compile time of this application, inventive archiving-type files, such as jar files, tar files, etc., are added to the application in step S2. These inventive archiving-type files are registered as a component, such as a servlet, inside the compiled application. This servlet will be hosted on the cloud to provide the remote access for the inventive backup/restore system. Once compile time is successfully completed, the application, including the registered component, is published to the cloud in step S3.

In the second phase P2, during execution of the compiled application in the cloud, the inventive archiving-type files are executed. In step S4, these archiving-type files find entities in the application, and generate, in step S5, one or more query statements to obtain the data for backup. Execution of the query statements in step S6 enables data to be obtained and published via the inventive servlet.

The inventive process is now described in more detail with an example. Assume an application developer develops software for execution on Google AppEngine (GAE). In phase 1 P1, during the compile time in the developer's development environment, the developer creates his GAE application. Inventive archiving-type files, such as jar files, in accordance with the present invention, are added to this GAE application, and the GAE application's web.xml file is modified to register a servlet in accordance with the present invention. A servlet is a concept in the Java programming language, e.g., J2EE, such as a class which extends from javax.servlet.GenericServlet. A jar file is a package format in Java and may contain multiple java classes. Upon completion of these additions and other software development, the GAE application is published to GAE.

In phase 2 P2, during the GAE application initialization procedure, all entities with Java reflection are found using the registered servlet and jar files. In particular, each class which is annotated by @Entity is determined, and the Java Persistence Application Program Interface (WA) specification is followed to find all properties and the property type of this entity. Based on these findings, the SQL statement to query out the information for backup from GAE JPA can be generated. All this information will be published via the servlet registered in phase 1. Accordingly, a servlet hosted inside GAE is enabled to send the entity information to anyone using Hypertext Transfer Protocol (http). Based on this published information, a user can determine how many entities exist in GAE and can choose to perform a backup on some and/or all of these entities.

In the above example, GAE provides the data store APIs to help the application developers to store the data inside the cloud environment. Developers may store the data in a variety of ways. One approach, discussed above, is to use Google's raw API (data store API). Another approach is to use the Java Data Object (JDO) API. Yet another approach is to use the JPA. With any of these approaches, an annotation processor can be added to the developer's application to parse the user codes to detect all entities created in the code of the application. In one embodiment, a list of these entities can be displayed and the user/customer can be asked to confirm the generated list via a user interface (UI). The display can be done on a display device. The UI can be an input device such as a keyboard, terminal, touch screen or the like.

In one embodiment, the software developer may add a software and/or application library, in accordance with the inventive system, to his application(s). Use of this library enables, in one embodiment, the backup/restore features to be provided to the developer's applications hosted in GAE. When the data is backed up out of GAE, the user can be assisted in performing the restore and/or simulating the GAE with a local environment separate from the cloud, using the inventive system. GAE is using JDO/JPA as the interface between developers and GAE. At present, using this interface, data can be retrieved from GAE. Advantageously, providing this same interface to the user applications enables the user to host his application out of GAR Moreover, this approach can be implemented transparently to the developers.

The present invention advantageously helps users backup their key application data out of the cloud environment and provides them with a safe copy for further restore or disaster recovery. Users may significantly benefit from having a local safe copy of their data, either for business or debug purposes.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided. The program storage device can be ROM, RAM, floppy disks, compact disks (CD), DVDs, memory, or the like.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for backing up data computed using an application in a cloud computing environment, said method comprising:
   modifying the application to register a servlet;
   publishing the application that was modified to the cloud computing environment;
   during execution of the application, using the servlet for:
      detecting annotated entities created in code of the application by parsing user codes;
      finding out properties and property types of the annotated entities;
      generating a plurality of structured query language (SQL) statements to query out data to be backed up in accordance with the annotated entities; and
      publishing the backed up data,
   wherein at least one of modifying the application, publishing the application, and using the servlet is to be performed using at least one computer.

2. The method according to claim 1, wherein modifying further comprises inserting archiving-type files into the application.

3. The method according to claim 1, further comprising adding an annotation processor to the application.

4. The method according to claim 3, wherein the annotation processor is to parse the user codes to detect all of the entities that are created in the code of the application.

5. The method according to claim 1, further comprising generating a user interface displaying one of the plurality of SQL statements performed during the execution of the application.

6. The method according to claim 5, further comprising confirming by a user the displayed one of the plurality of SQL statements.

7. The method according to claim 1, further comprising adding a library to the application.

8. The method according to claim 1, further comprising restoring the application using the backed up data.

9. The method according to claim 1, further comprising simulating the application using the backed up data.

10. A computer program product comprising:
a computer readable storage medium having computer readable program code embodied therewith, the computer readable program code comprising:
computer readable program code to modify the application to register a servlet;
computer readable program code to publish the application to the cloud computing environment;
during execution of the application, computer readable program code to use the servlet to:
- detect annotated entities created in the code of the application by parsing user codes;
- find out properties and property types of the annotated entities;
- generate a plurality of structured query language (SQL) statements to query out data to be backed up in accordance with the annotated entities; and
- publish the backed up data.

11. The computer readable storage medium according to claim 10, wherein the-computer readable program code to modify is further to insert archiving-type files into the application.

12. The computer readable storage medium according to claim 10, further comprising computer readable program code to add an annotation processor to the application.

13. The computer readable storage medium according to claim 10, further comprising computer readable program code to generate a user interface displaying one of the plurality of SQL statements performed during the execution of the application.

14. The computer readable storage medium according to claim 13, further comprising computer readable program code to confirm by a user the displayed SQL statement.

15. The computer readable storage medium according to claim 10, further comprising computer readable program code to add a library to the application.

16. A system for backing up data computed using an application in a cloud computing environment, comprising:
a processor;
a module to modify the application to register a servlet, and publish the application to the cloud computing environment, and during execution of the application, the module being further to use the servlet for detecting annotated entities created in the code of the application by parsing user codes, finding out properties and property types of the annotated entities, generating a plurality of structured query language (SQL) statements to query out data to be backed up in accordance with the annotated entities, and publishing the backed up data.

17. The system according to claim 16, wherein the module is further to insert archiving-type files into the application.

18. The system according to claim 16, wherein the module is further to add an annotation processor to the application.

19. The system according to claim 16, further comprising a display device to display one of the plurality of the SQL statements performed during the execution of the application.

20. The system according to claim 19, further comprising an input device for confirming by a user the displayed SQL statements.

21. The system according to claim 16, wherein the module is further to add a library to the application.

* * * * *